(12) United States Patent
Ryu

(10) Patent No.: US 7,973,461 B2
(45) Date of Patent: Jul. 5, 2011

(54) LIGHT EMITTING DEVICE AND DISPLAY DEVICE USING THE SAME

(75) Inventor: Kyung-Sun Ryu, Suwon-si (KR)

(73) Assignee: Samsung SDI Co., Ltd., Yongsin-si (KR)

( * ) Notice: Subject to any disclaimer, the term of this patent is extended or adjusted under 35 U.S.C. 154(b) by 0 days.

(21) Appl. No.: 12/643,956

(22) Filed: Dec. 21, 2009

(65) Prior Publication Data

US 2010/0171408 A1 Jul. 8, 2010

(30) Foreign Application Priority Data

Jan. 8, 2009 (KR) .................. 10-2009-0001344

(51) Int. Cl.
*H01J 9/02* (2006.01)
(52) U.S. Cl. ....................... 313/310; 313/495
(58) Field of Classification Search .......... 313/309, 313/310, 336, 351, 495
See application file for complete search history.

(56) References Cited

FOREIGN PATENT DOCUMENTS

| KR | 10-2004-0069506 A | 8/2004 |
|---|---|---|
| KR | 10-2005-0030435 A | 3/2005 |
| KR | 10-2005-0051899 A | 6/2005 |
| KR | 10-2006-0059746 A | 6/2006 |
| KR | 10-2006-0092514 A | 8/2006 |

*Primary Examiner* — Vip Patel
(74) *Attorney, Agent, or Firm* — Christie, Parker & Hale, LLP

(57) ABSTRACT

A light emitting device and a display device using the same. The light emitting device includes: a substrate provided with recesses formed in a stripe pattern; first electrodes disposed inside the recesses in a stripe pattern aligned parallel to the recesses; electron emission regions disposed on the first electrodes; second electrodes disposed in a stripe pattern aligned in a direction crossing the first electrodes and closely fixed to the substrate; and an adhesive member for fixing the second electrodes to the substrate. The second electrodes include mesh portions spaced apart from tops of the electron emission regions in crossing of the first electrodes and the second electrodes, supports surrounding the mesh portions and connected with the substrate, and combining grooves formed at edges of the supports facing the substrate. The adhesive members are disposed in the combining grooves of the second electrodes to connect the second electrodes with the substrate.

16 Claims, 5 Drawing Sheets

LIGHT EMITTING DEVICE AND DISPLAY DEVICE USING THE SAME

CROSS-REFERENCE TO RELATED APPLICATION

This application claims priority to and the benefit of Korean Patent Application No. 10-2009-0001344, filed in the Korean Intellectual Property Office on Jan. 8, 2009, the entire content of which is incorporated herein by reference.

BACKGROUND

1. Field

The following description relates generally to a light emitting device and a display device using the same.

2. Description of the Related Art

Among light emitting devices, there are light emitting devices using field emission principles. Among various types of light emitting devices using field emission principles, one light emitting device includes a front substrate provided with a phosphor layer and an anode electrode, and a rear substrate provided with electron emitting regions and driving electrodes. Here, the front substrate and the rear substrate are combined along their edges into one body using a sealing member, and then an inner space is evacuated to form a vacuum chamber together with the sealing member.

The driving electrodes include cathode electrodes and gate electrodes formed spaced apart from the cathode electrodes and extending along a direction crossing (e.g., intersecting) the cathode electrodes. Openings are formed on the gate electrodes at crossing regions of the cathode electrodes and the gate electrodes, and the electron emission regions are disposed on the cathode electrodes and spaced apart from the gate electrodes.

When a set or predetermined driving voltage is applied to one of the cathode electrodes and a corresponding gate electrode of the gate electrodes, a voltage difference between the two electrodes creates an electric field in a corresponding electron emission region such that the electron emission region emits electrons. The emitted electrons are drawn to a higher voltage applied to the anode electrode and collide with and excite the phosphor layer, and this causes the phosphor layer to emit visible light.

In order to effectively minimize divergence of an electron beam emitted from the electron emission region spaced apart from the gate electrode, a structure is used in which a groove is formed in the rear substrate, and the cathode electrode and the electron emission region are disposed inside the groove of the rear substrate.

However, such a structure has a problem in that it is difficult to accurately fix the gate electrode to be at a position where the openings correspond to the electron emission region. Furthermore, if the gate electrode is not stably fixed, noise may occur due to vibration at a driving frequency and luminance may be non-uniform due to variation in height of the openings.

The above information disclosed in this Background section is only for enhancement of understanding of the background of the described technology and therefore it may contain information that does not form the prior art that is already known in this country to a person of ordinary skill in the art.

SUMMARY

Aspects of embodiments of the present invention are directed toward a light emitting device that has an improved light emitting quality and a stable and simplified structure, and a display device using the same.

A light emitting device according to an exemplary embodiment includes: a first substrate having recesses in a stripe pattern extending along a first direction; a plurality of first electrodes inside the recesses in a stripe pattern extending along a second direction in parallel with the first direction of the recesses; a plurality of electron emission regions on the first electrodes; a plurality of second electrodes in a stripe pattern extending along a third direction crossing the second direction of the first electrodes and fixed to the first substrate; and an adhesive member for fixing the second electrodes to the first substrate. Here, the second electrodes include a plurality of mesh portions spaced apart from tops of the electron emission regions at crossing regions of the first electrodes and the second electrodes, a plurality of supports surrounding the mesh portions and connected with the first substrate, and a plurality of combining grooves at edges of the supports facing the first substrate. In addition, the adhesive members are in the combining grooves of the second electrodes to connect the second electrodes with the first substrate.

The light emitting device may further include: a second substrate opposing the first substrate; and a third electrode and a phosphor layer on the second substrate and between the first substrate and the second substrate.

The second electrodes may each be made of a metal plate having a greater thickness than that of a corresponding one of the first electrodes and are spaced apart from the electron emission regions.

The combining grooves may be formed by half-etching corners of the supports.

The combining grooves may be formed at corners extending along a length direction of the second electrodes.

Each of the recesses may have a greater width than that of a corresponding one of the first electrodes, and a greater depth than the total thickness of the corresponding one of the first electrodes and a corresponding one of the electron emission regions.

The adhesive members may be formed by baking a glass paste.

Each of the mesh portions may have a plurality of openings for passing an electron beam emitted from a corresponding one of the electron emission regions.

A display device according to an exemplary embodiment includes the above-described light emitting device and a display panel supplied with light from the light emitting device to display images.

DETAILED DESCRIPTION

Figure 1:
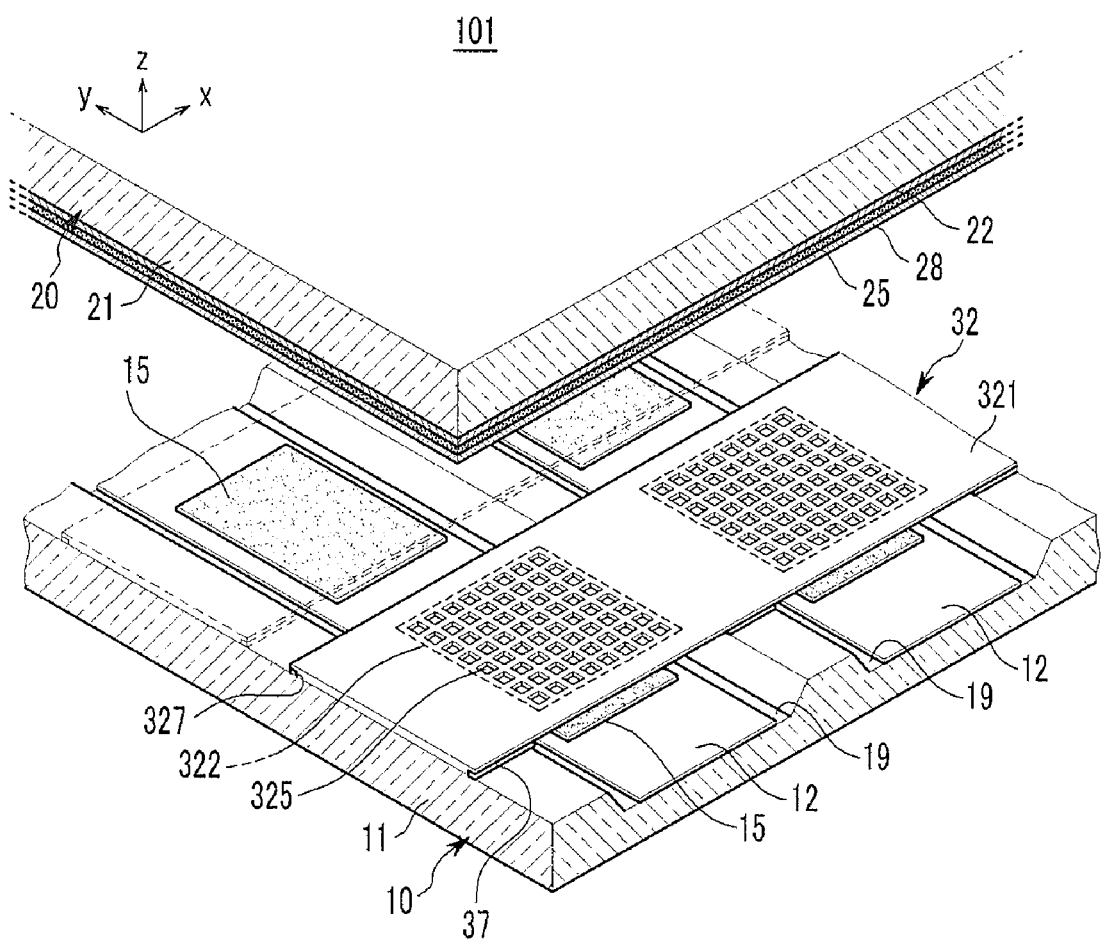
FIG. 1 is a schematic cut-away perspective view of a part of a light emitting device according to an exemplary embodiment.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

In addition, the size and the thickness of each element in the drawings are samples for better understanding and ease of description, and the present invention is not limited thereto.

In the drawings, the thickness of layers, films, panels, regions, etc., may be exaggerated for clarity, better understanding, and ease of description. It will be understood that when an element such as a layer, film, region, or substrate is referred to as being "on" an other element, it can be directly on the other element or one or more intervening elements may also be present therebetween. In contrast, when an element is referred to as being "directly on" an other element, there are no intervening elements present between the element and the other element.

A light emitting device 101 according to an exemplary embodiment will now be described in more detail with reference to FIGS. 1 to 3.

As shown in FIG. 1, the light emitting device 101 according to an exemplary embodiment includes a first substrate assembly 10, a second substrate assembly 20 opposing the first substrate assembly 10, and a sealing member 38 (shown in FIG. 2) disposed between the first substrate assembly 10 and the second substrate assembly 20 to bond the two substrate assemblies 10 and 20 together. The inside of the first substrate assembly 10, the second substrate assembly 20, and the sealing member 38 is in a vacuum state with a pressure of about $10^{-6}$ Torr.

The first substrate assembly 10 includes a first substrate (e.g., a rear substrate) 11, first electrodes 12, electron emission regions 15, and second electrodes 32. Here, in one embodiment, the first electrodes 12 are cathode electrodes, and the second electrodes 32 are gate electrodes.

The first substrate 11 has recesses 19 formed in a stripe pattern.

The recesses 19 are created by removing a portion of the first substrate 11 using a method such as an etching or sand blasting. Although the recesses 19 of the first substrate 11 are shown to have slanted side walls in FIGS. 1 and 2, an embodiment is not limited thereto. Therefore, the recesses 19 of the first substrate 11 may have vertical sidewalls.

For example, the first substrate 11 may be about 1.8 mm thick. In addition, the recesses 19 may be about 40 µm deep and between about 300 µm and about 600 µm wide.

The first electrodes 12 are disposed on bottom surfaces of the recesses 19. In this case, the first electrodes 12 are disposed in a stripe pattern aligned in a direction (y-axis direction) parallel to the recesses 19. That is, the length direction (y-axis direction) of the first electrodes 12 is the same as the length direction (y-axis direction) of the recesses 19. The first substrate 11 between the recesses 19 functions as barriers (e.g., barrier ribs) for separating adjacent first electrodes 12.

The second electrodes 32 are disposed in a stripe pattern in a direction (x-axis direction) crossing (e.g., intersecting) the first electrodes 12, and are closely fixed to the upper surface of the first substrate 11. Here, the upper surface refers to an inside of the first substrate 11 where the recesses 19 are not formed. Thus, the second electrodes 32 are spaced apart from the first electrodes 12 disposed inside the recesses 19 of the first substrate 11 by approximately the depth of the recesses 19.

The electron emission regions 15 are formed on the first electrodes 12 to be spaced apart from the second electrodes 32. Although the case of the electron emission regions 15 being formed at the crossing regions of the first electrodes 12 and the second electrodes 32 is shown in FIG. 1 as an example, the present invention is not limited thereto. For example, the electron emission regions 15 may be formed on the first electrodes 12 in a stripe pattern parallel to the first electrodes 12.

The electron emission regions 15 contain materials that emit electrons when placed in an electric field in a vacuum, such as, for example, carbon-based materials and/or nanometer-sized materials. For example, the electron emission regions 15 may contain materials selected from the group consisting of carbon nanotubes, graphite, graphite nanofibers, diamond, diamond-phase carbon, fullerene ($C_{60}$), silicon nanowires, and combinations thereof.

The electron emission regions 15 may be formed as an electron emission layer having a set or predetermined thickness through a thick film process such as screen printing. In other words, the electron emission regions 15 may be formed through a process of: screen-printing a paste mixture containing electron emitting materials on the first electrodes 12; drying and baking the printed mixture; and then activating a surface of the electron emission regions 15 such that the electron emitting materials are exposed at the surface of the electron emission regions 15. The surface activating process can be performed by attaching and detaching an adhesive tape. The surface activating process can remove a portion of the surface of the electron emission regions 15, and at the same time erect the electron emitting materials such as carbon nanotubes substantially vertically with respect to the surface of the electron emission regions 15.

In addition, the recesses 19 are formed to have a greater width than that of the first electrodes 12 and a greater depth than the total thickness of the first electrodes 12 and the electron emission regions 15. Thus, the second electrodes 32 can be stably spaced apart from the first electrodes 12 disposed inside the recesses 19 of the first substrate 11. That is, the first electrodes 12 and the second electrodes 12 are stably insulated from each other.

The second electrodes 32 include mesh portions 322 spaced apart from tops of the electron emission regions 15 at the cross regions of the first electrodes 12 and the second electrodes 32, a support 321 surrounding the mesh portions 322 and combined with the first substrate 11, and a combining groove 327 formed on an edge of the support 321 facing the first substrate 11. Here, the mesh portions 322 have a plurality of openings 325 for passing electron beams emitted from the electron emission regions 15. The combining groove 327 is formed at a corner aligned in the length direction of the second electrodes 32.

The mesh portions 322 are formed at the crossing regions of the first electrodes 12 and the second electrodes 32 in FIG. 1, but an embodiment is not limited thereto. For example, the mesh portions 322 may be formed at areas where there is no crossing with the first electrodes 12 and the second electrodes as well as at the cross regions of the first electrodes 12 and the second electrodes 32. In this case, a margin of error in a process of aligning the second electrodes 32 can be increased. In contrast, as shown in FIG. 1, when the mesh portions 322 are formed at the cross regions of the first electrodes 12 and the second electrodes 32, line resistance of the second electrodes 32 can be reduced to suppress a voltage drop of the second electrodes 32 upon driving.

The second electrodes 32 are made of a metal plate that is thicker than the first electrodes 12. For example, the second electrodes 32 may be formed by cutting a metal plate into stripes, removing a portion of the metal plate using a method such as etching or the like, and forming the openings 325. In addition, the combining groove 327 can be formed by removing a portion of a corner through a half etching process.

The second electrodes 32 may be made of a Ni-Fe alloy or other suitable metal materials, and may be 50 μm thick and 10 mm wide. In one embodiment, the second electrodes 32 are manufactured in a separate process from the first electrodes 12 and the electron emission regions 15, and then fixed to the upper surface of the first substrate 11 aligned in a direction crossing the first electrodes 12. Since the first electrodes 12 and the electron emission regions 15 are located inside the recesses 19 of the first substrate 11, just fixing the second electrodes 32 to the upper surface of the first substrate 11 can naturally insulate the first electrodes 12 and the second electrodes 32 from each other.

The first substrate assembly 10 further includes an adhesive member 37 disposed in the combining groove 327 of the second electrodes 32 to connect the second electrodes 32 with the first substrate 11. In other words, the second electrodes 32 are fixed to the upper surface of the first substrate 11 by the adhesive member 37.

The adhesive member 37 is formed by baking a glass paste. Hereinafter, a method of fixing the second electrodes 32 to the first substrate 11 using the adhesive member 37 will be described in more detail. First, the adhesive member 37 in a paste state is applied to a certain upper surface of the first substrate 11 to which the second electrodes 12 are to be fixed, and the second electrodes 32 are aligned so that the adhesive member 37 contacts the combining groove 327 of the second electrodes 32. Subsequently, the adhesive member 37 is baked and hardens in a state where the second electrodes 32 and the first substrate 11 are close to each other. When the adhesive member 37 hardens, the second electrodes 32 and the first substrate 11 are combined and stably fixed close to each other.

One crossing region of the first electrodes 12 and the second electrodes 32 may be formed on one pixel area of the light emitting device 101, or two or more crossing regions may be formed on one pixel area of the light emitting device 101. In the latter case, the first electrodes 12 or the second electrodes 32 corresponding to one pixel area are electrically connected to each other so that they receive the same voltage.

The second substrate assembly 20 includes a second substrate (e.g., a front substrate) 21, a third electrode 22, a phosphor layer 25, and a reflective layer 28. The third electrode 22, the phosphor layer 25, and the reflective layer 28 are sequentially formed on the second substrate 21 and between the first substrate 11 and the second substrate 21. That is, the third electrode 22 is formed closest to the second substrate 21, followed by the phosphor layer 25 and then the reflective layer 28. Here, in one embodiment, the third electrode 22 is an anode electrode.

In one embodiment, the third electrode 22 is made of a transparent conductive material such as indium tin oxide (ITO) so as to transmit visible light emitted from the phosphor layer 25. The third electrode 22, which is an accelerating electrode used to draw an electron beam, receives a positive DC voltage of several thousand volts or more (hereinafter, referred to as an "anode voltage") to keep the phosphor layer 25 at a high potential.

The phosphor layer 25 may be made of a mixture of red phosphor, green phosphor, and blue phosphor to emit white light. Although it is shown in FIGS. 1 and 2 that the phosphor layer 25 is formed on the entire light emitting area of the second substrate 21, an embodiment is not limited thereto. For example, the phosphor layer 25 may be formed separately for each pixel area.

The reflective layer 28 may be made of a thin film of aluminum having a width of several thousand angstroms (A) and a plurality of fine holes for passing an electron beam. The reflective layer 28 reflects visible light emitted from the phosphor layer 25 toward the first substrate assembly 10, and thus increases the luminance of the light emitting device 101.

Either the third electrode 22 or the reflective layer 28 may be omitted. If the third electrode 22 is omitted, the anode voltage is applied to the reflective layer 28 such that the reflective layer is configured to perform the same function as the third electrode 22.

Although not shown, the light emitting device 101 may further include a spacer between the first substrate assembly 10 and the second substrate assembly 20 to withstand the vacuum pressure and maintain the distance between the two substrate assemblies 10 and 20 to be constant.

According to this configuration, in pixels where a voltage difference between the first electrodes 12 and the second electrodes 32 is more than a threshold value, an electric field is generated at the periphery of the field emission regions 15 causing the field emission regions 15 to emit electrons. The emitted electrons are drawn to the third electrode 22 held at the anode voltage and collide with the phosphor layer 25, causing the phosphor layer to emit light. The luminance of the phosphor layer 25 in each pixel corresponds to the amount of electrons emitted in the corresponding pixel.

Figure 2:
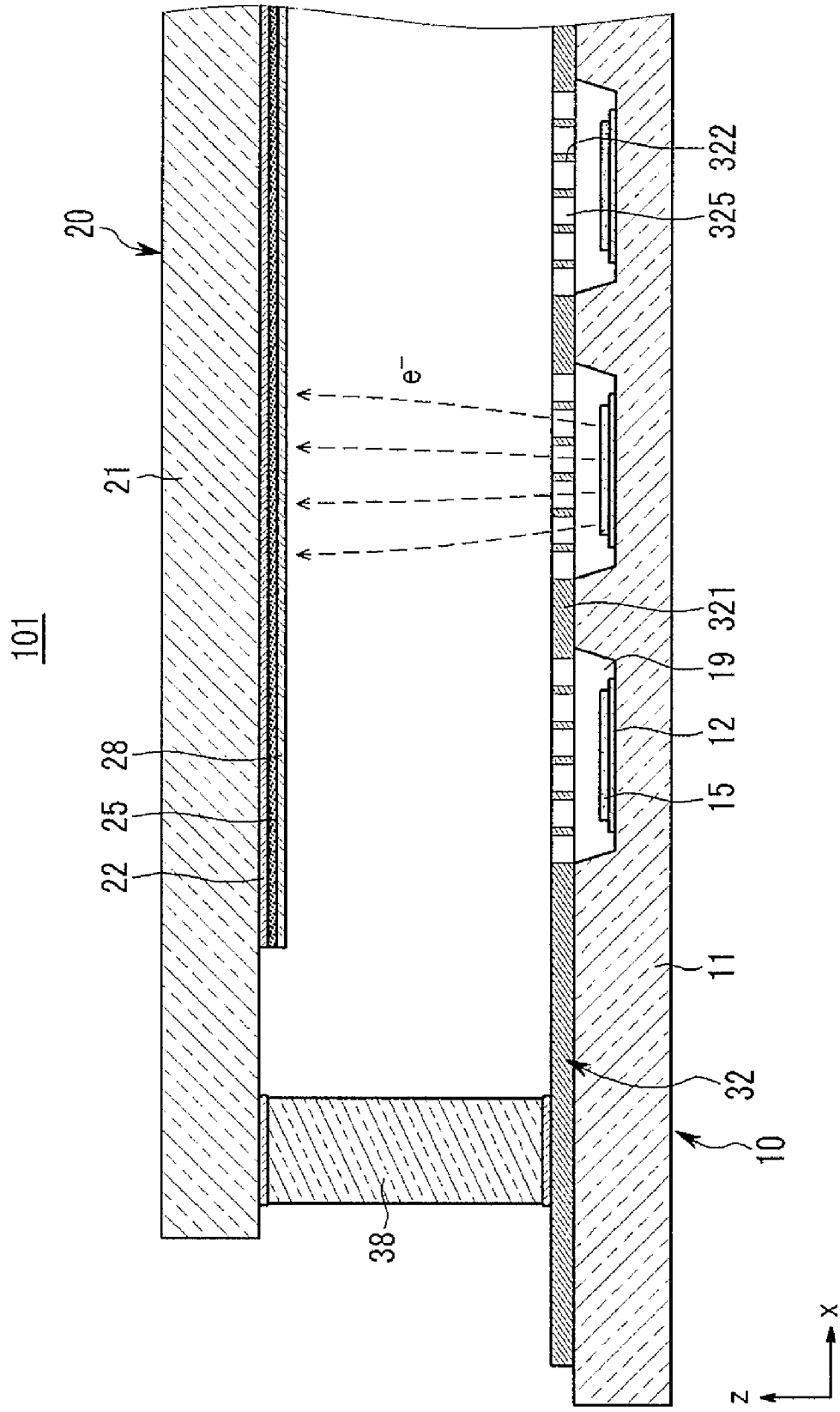
FIG. 2 and FIG. 3 are schematic cross-sectional views of a part of the light emitting device shown in FIG. 1.

As shown in FIG. 2, since the mesh portions 322 of the second electrodes 32 are positioned directly over the electron emission regions 15, electrons emitted from the electron emission regions 15 can pass through the openings 325 of the mesh portions 322 with reduced or minimized beam divergence and reach the phosphor layer 25. The light emitting device 101 according to an exemplary embodiment can decrease initial electron beam divergence to effectively suppress electrical charging of sidewalls of the recesses 19.

As a result, the light emitting device 101 according to an exemplary embodiment can improve a withstand voltage characteristic of the first electrodes 12 and the second electrodes 32 to stabilize driving thereof, and can achieve high luminance by applying a high voltage of 10 kV or more, and, in one embodiment, between about 10 kV and about 15 kV, to the third electrode 22.

Furthermore, in the light emitting device 101 according to an exemplary embodiment, a thick film process for forming an insulating layer and a thin film process for forming the second electrodes 32 in the conventional art can be omitted, and thus the manufacturing process can be simplified. Since the second electrodes 32 are easily aligned at the time of disposition as described above, productivity can be improved.

In addition, since the second electrodes 32 are disposed after forming the electron emission regions 15, a problem of the conventional art in which the first electrodes 12 and the second electrodes 32 are short circuited with each other due to the electrical coupling of the conductive electron emitting materials between the first electrodes 12 and the second electrodes 32 during the process of forming the electron emission regions 15 can be reduced or prevented.

Figure 3:
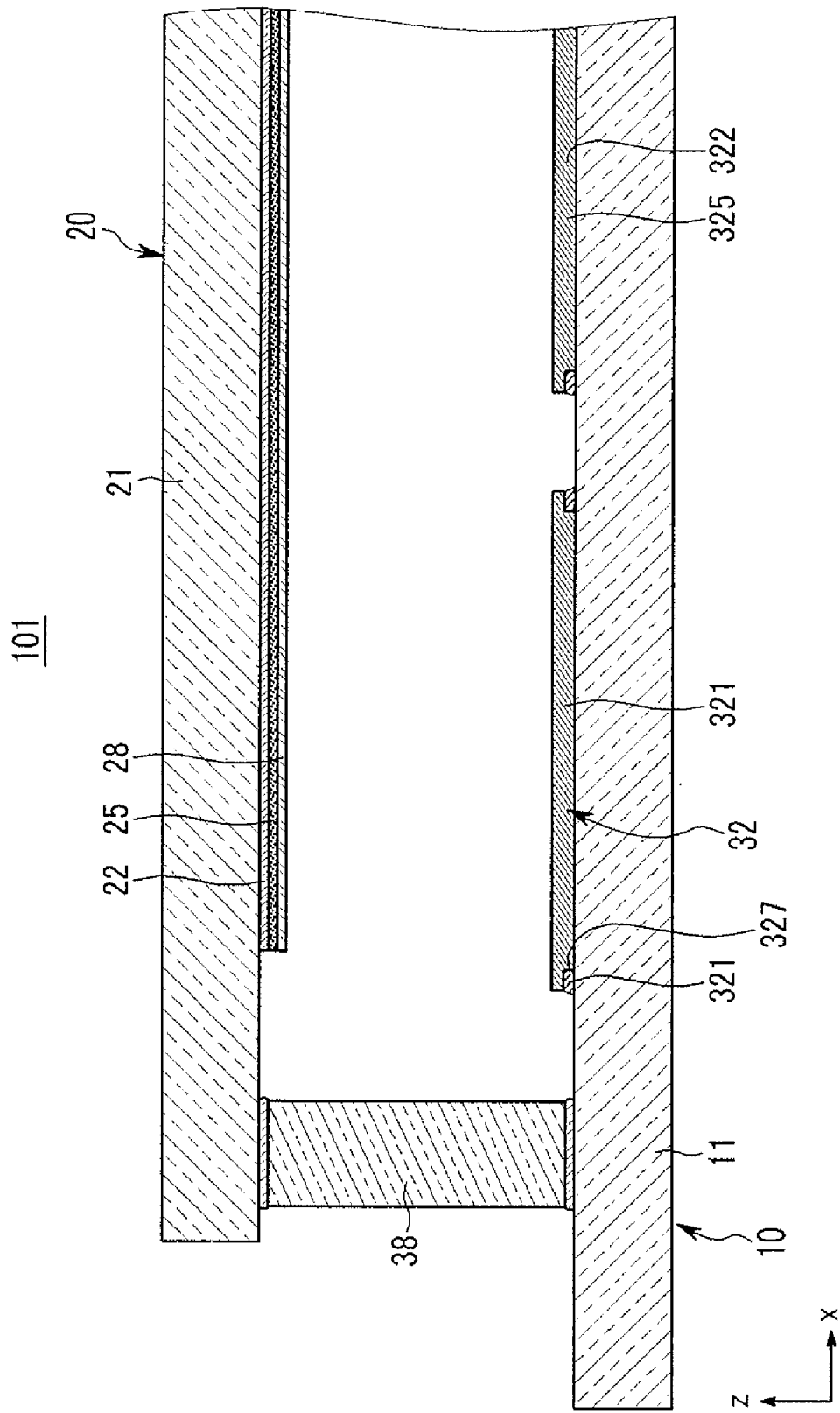

As shown in FIG. 3, since the second electrodes 32 are stably fixed close to the first substrate 11 by the adhesive member 37, vibration due to a driving frequency can be suppressed to reduce or prevent noise. The height of the openings 325 of the mesh portions 322 can be held constant to improve uniformity of luminance.

A display device 201 according to an exemplary embodiment will now be described in more detail with reference to FIGS. 4 and 5. The display device 201 includes the light emitting device 101 shown in FIG. 1.

Figure 4:
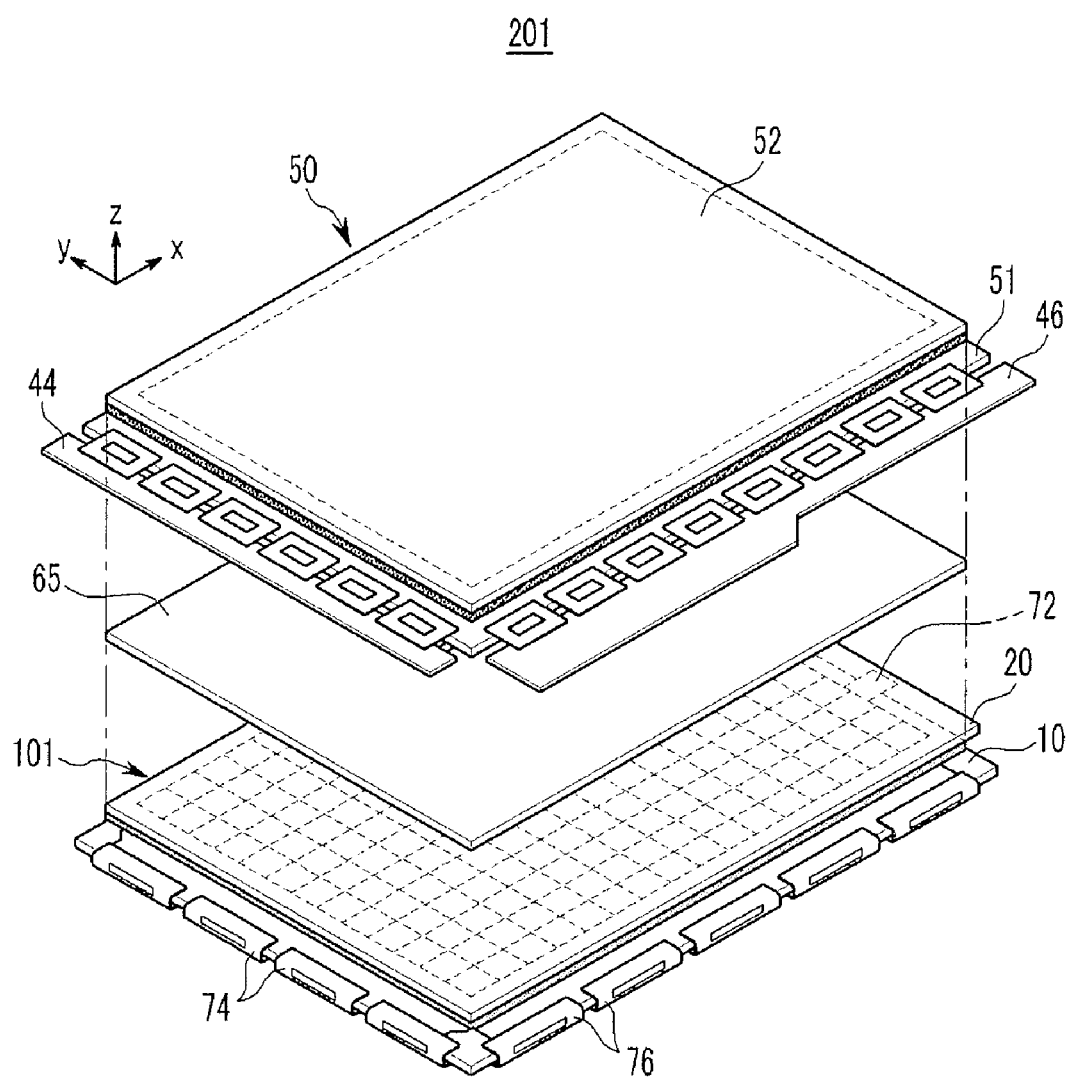
FIG. 4 is a schematic exploded perspective view of a display device according to an exemplary embodiment.

As shown in FIG. 4, the display device 201 includes the light emitting device 101 and a display panel 50 disposed in front of the light emitting device 101. The display device 201 may further include a diffusion member 65 that is disposed between the light emitting device 101 and the display panel 50 and uniformly diffuses light emitted from the light emitting device 101. In this case, the diffusion member 65 and the light emitting device 101 are spaced apart from each other by a set or predetermined distance. The display device 201 adopts the light emitting device 101 according town exemplary embodiment as a light source.

Figure 5:
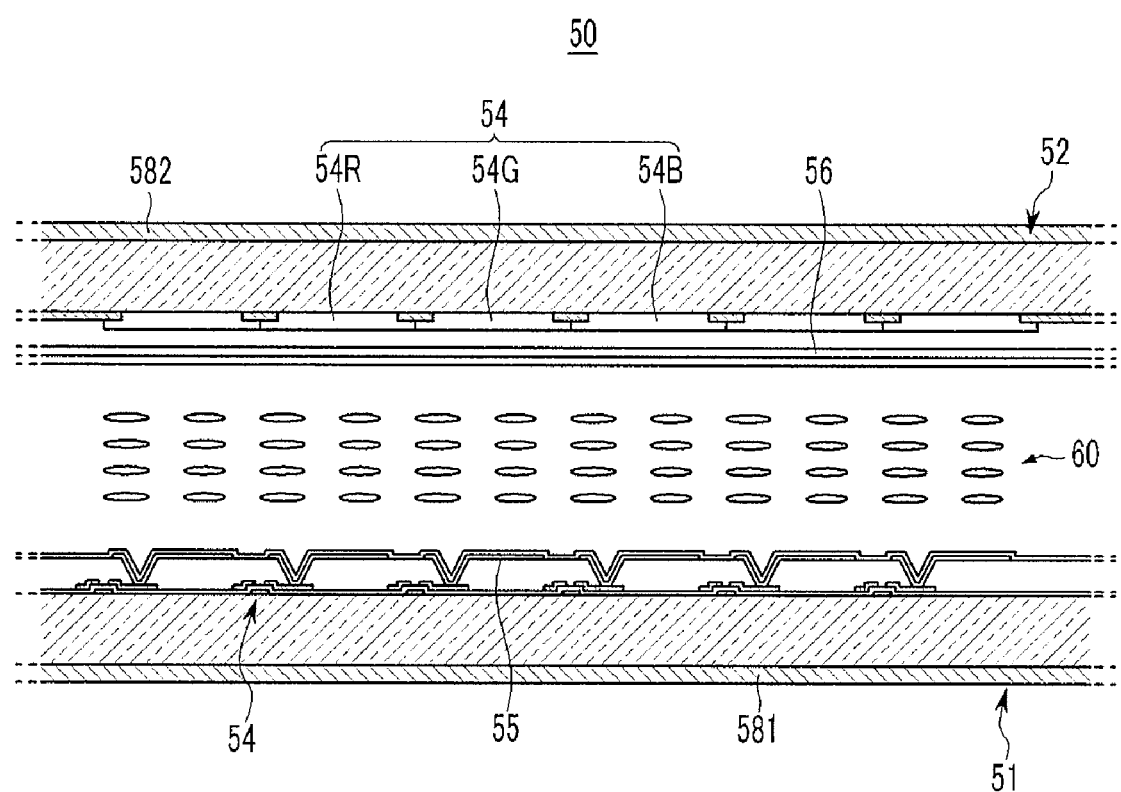
FIG. 5 is a schematic cross-sectional view of a part of a display panel shown in FIG. 4.

Although the display panel 50 is configured as a liquid crystal display panel in FIGS. 4 and 5, the present invention is not limited thereto. For example, the display panel 50 may be another non-emissive display panel as well as a liquid crystal display panel.

As shown in FIG. 5, the display panel 50 includes a first panel 51 provided with thin film transistors (TFTs) 54 and pixel electrodes 55, a second panel 52 provided with a color filter layer 54 and a common electrode 56, and a liquid crystal layer 60 disposed between the first panel 51 and the second panel 52. Polarizers 581 and 582 polarizing light passing through the display panel 50 are attached on the front surface of the first panel 51 and the rear surface of the second panel 52, respectively.

One pixel electrode 55 is provided for each subpixel, and driving of the pixel electrodes 55 is controlled by the TFTs 54.

A plurality of subpixels that represent different colors form a single pixel, which is the smallest unit for displaying an image. In one embodiment, the pixel electrodes 55 and the common electrode 56 are made of a transparent conductive material. The color filter layer 54 includes a red filter layer 54R, a green filter layer 54G, and a blue filter layer 54B provided in respective subpixels.

When the TFT 54 of a certain subpixel turns on, an electric field is generated between the pixel electrode 55 and the common electrode 56. The electric field changes the orientation of liquid crystal molecules of the liquid crystal layer 60, thereby changing light transmittance. By performing such operation, the display panel 50 can control luminance and color for each pixel to display images.

The display panel 50 is not limited to the above-described configuration and can be modified in a variety of suitable ways using suitable structures.

As shown in FIG. 4, the display device 201 also includes a gate circuit board 44 for supplying a gate driving signal to the gate electrode of each TFT 54, and a data circuit board 46 for supplying a data driving signal to the source electrode of each TFT 54.

The light emitting device 101 is provided with a smaller number of pixels than the display panel 50, and thus one pixel of the light emitting device 101 corresponds to two or more pixels of the display panel 50.

Each pixel of the light emitting device 101 can emit light according to gray levels of corresponding pixels of the display panel 50, and, for example, can emit light according to the highest gray level represented by the pixels of the display panel 50.

Each pixel of the light emitting device 101 can represent gray levels in grayscales of 2 bits to 8 bits.

Hereinafter, for better understanding and ease of description, the pixels of the display panel 50 are referred to as first pixels, the pixels of the light emitting device 101 are referred to as second pixels, and first pixels corresponding to one of the second pixels are referred to as a first pixel group.

A driving operation of the light emitting device 101 may include the steps of: a signal controller that controls the display panel 50 for detecting the highest gray level among the gray levels of the first pixels of the first pixel group; calculating a gray level required for second pixel light emission based on the detected gray level and converting it into digital data; generating a driving signal of the light emitting device 101 using the digital data; and applying the generated driving signal to the driving electrodes of the light emitting device 101.

The driving signal of the light emitting device 101 includes a scan signal and a data signal. The scan signal is applied to one of the first electrode 12 and the second electrode 32, and the data signal is applied to the other.

In addition, a data circuit board and a scan circuit board may be disposed at the rear side of the light emitting device 101 for driving the light emitting device 101. The data circuit board and the scan circuit board are connected to the first electrodes 12 and the second electrodes 32 via first connectors 76 and second connectors 74, respectively. A third connector 72 applies the anode voltage to the third electrode 22.

As such, the second pixels of the light emitting device 101 emit light at a certain or predetermined gray level in synchronization with a corresponding first pixel group when the first pixel group displays images. The light emitting device 101 provides higher luminance at bright areas of a screen realized by the display panel 50 and lower luminance at dark areas thereof. Therefore, the display device 201 according to an exemplary embodiment can increase a contrast ratio of a screen and can realize clearer image quality.

The display device 201 can be equipped with the light emitting device having improved image quality and a stably simplified structure according to the above-described configuration.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A light emitting device comprising:
a first substrate having recesses in a stripe pattern extending along a first direction;
a plurality of first electrodes inside the recesses in a stripe pattern extending along a second direction in parallel with the first direction of the recesses;
a plurality of electron emission regions on the first electrodes;
a plurality of second electrodes in a stripe pattern extending along a third direction crossing the second direction of the first electrodes and fixed to the first substrate; and
an adhesive member for fixing the second electrodes to the first substrate,
wherein the second electrodes comprise a plurality of mesh portions spaced apart from tops of the electron emission regions at crossing regions of the first electrodes and the second electrodes, a plurality of supports surrounding the mesh portions and connected with the first substrate, and a plurality of combining grooves at edges of the supports facing the first substrate, and
wherein the adhesive members are in the combining grooves of the second electrodes to connect the second electrodes with the first substrate.

2. The light emitting device of claim 1, further comprising:
a second substrate opposing the first substrate; and
a third electrode and a phosphor layer on the second substrate and between the first substrate and the second substrate.

3. The light emitting device of claim 2, wherein
the second electrodes are each composed of a metal plate having a greater thickness than that of a corresponding one of the first electrodes and are spaced apart from the electron emission regions.

4. The light emitting device of claim 3, wherein
the combining grooves are formed by half etching corners of the supports.

5. The light emitting device of claim 3, wherein
the combining grooves are at corners extending along a length direction of the second electrodes.

6. The light emitting device of claim 2, wherein
each of the recesses has a greater width than that of a corresponding one of the first electrodes, and a greater depth than the total thickness of the corresponding one of the first electrodes and a corresponding one of the electron emission regions.

7. The light emitting device of claim 2, wherein
the adhesive members are formed by baking a glass paste.

8. The light emitting device of claim 1, wherein
each of the mesh portions has a plurality of openings for passing an electron beam emitted from a corresponding one of the electron emission regions.

9. A display device comprising:
a light emitting device comprising:
   a first substrate having recesses in a stripe pattern extending along a first direction;
   a plurality of first electrodes inside the recesses in a stripe pattern extending along a second direction in parallel with the first direction of the recesses;
   a plurality of electron emission regions on the first electrodes;
   a plurality of second electrodes in a stripe pattern extending along a third direction crossing the second direction of the first electrodes and closely fixed to the first substrate; and
   an adhesive member for fixing the second electrodes to the first substrate,
   wherein the second electrodes comprise a plurality of mesh portions spaced apart from tops of the electron emission regions at crossing regions of the first electrodes and the second electrodes, a plurality of supports surrounding the mesh portions and connected with the first substrate, and a plurality of combining grooves at edges of the supports facing the first substrate, and
   wherein the adhesive members are in the combining grooves of the second electrodes to connect the second electrodes with the first substrate; and
a display panel configured to be supplied with light from the light emitting device to display images.

10. The display device of claim 9, further comprising:
a second substrate opposing the first substrate; and
a third electrode and a phosphor layer on the second substrate and between the first substrate and the second substrate.

11. The display device of claim 10, wherein
the second electrodes are each composed of a metal plate having a greater thickness than that of a corresponding one of the first electrodes and are spaced apart from the electron emission regions.

12. The display device of claim 11, wherein
the combining grooves are formed by half etching corners of the supports.

13. The display device of claim 11, wherein
the combining grooves are at corners extending along a length direction of the second electrodes.

14. The display device of claim 10, wherein
each of the recesses has a greater width than that of a corresponding one of the first electrodes, and a greater depth than the total thickness of the corresponding one of the first electrodes and a corresponding one of the electron emission regions.

15. The display device of claim 10, wherein
the adhesive members are formed by baking a glass paste.

16. The display device of claim 9, wherein
each of the mesh portions has a plurality of openings for passing an electron beam emitted from a corresponding one of the electron emission regions.

* * * * *